United States Patent
Tomlinson et al.

(10) Patent No.: US 10,467,099 B2
(45) Date of Patent: Nov. 5, 2019

(54) CONTROLLED AND VERIFIABLE INFORMATION DESTRUCTION

(71) Applicant: PQ Solutions Limited, London (GB)

(72) Inventors: Martin Tomlinson, Totnes (GB); Cen Jung Tjhai, London (GB); Andersen Cheng, London (GB)

(73) Assignee: PQ SOLUTIONS LIMITED, London (GB)

( * ) Notice: Subject to any disclaimer, the term of this patent is extended or adjusted under 35 U.S.C. 154(b) by 78 days.

(21) Appl. No.: 15/782,193

(22) Filed: Oct. 12, 2017

(65) Prior Publication Data

US 2018/0225175 A1    Aug. 9, 2018

(30) Foreign Application Priority Data

Feb. 4, 2017    (GB) .................................. 1701867.2

(51) Int. Cl.
| | |
|---|---|
| G06F 11/00 | (2006.01) |
| G06F 11/14 | (2006.01) |
| G06F 11/10 | (2006.01) |
| H03M 13/15 | (2006.01) |
| G06F 3/06 | (2006.01) |
| H04L 9/06 | (2006.01) |
| H04L 9/32 | (2006.01) |
| H03M 13/13 | (2006.01) |
| H03M 13/43 | (2006.01) |

(52) U.S. Cl.
CPC ........ *G06F 11/1402* (2013.01); *G06F 3/0604* (2013.01); *G06F 3/0652* (2013.01); *G06F 11/1012* (2013.01); *G06F 11/1084* (2013.01); *H03M 13/13* (2013.01); *H03M 13/154* (2013.01); *H03M 13/1515* (2013.01); *H03M 13/1585* (2013.01); *H04L 9/0637* (2013.01); *H04L 9/0643* (2013.01); *H04L 9/3239* (2013.01); *G06F 2201/835* (2013.01); *H03M 13/43* (2013.01); *H04L 2209/34* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 8,462,605 | B2 * | 6/2013 | Ferren ...................... | G11B 7/24 369/273 |
| 2005/0246509 | A1 * | 11/2005 | Topham .............. | G06F 11/1446 711/162 |
| 2007/0233609 | A1 * | 10/2007 | Bovee .................... | G06Q 10/10 705/59 |

\* cited by examiner

*Primary Examiner* — Daniel F. McMahon
(74) *Attorney, Agent, or Firm* — Morris & Kamlay LLP (57) ABSTRACT

Digital data archival methods and systems are described, providing controlled and verifiable information destruction. In one embodiment, the method comprises storing digitally encoded information, wherein the information is encoded as a sequence of numbers or symbols using parameters defining an associated error correction ability of an error correcting algorithm based on a lifetime of the digitally encoded information. Errors are periodically added to the sequence of numbers or symbols, such that the digitally encoded information is recoverable from the sequence of numbers or symbols during the defined lifetime, and after a total of number of added errors exceeds the associated error correction ability, the digitally encoded information cannot be retrieved.

20 Claims, 11 Drawing Sheets

CONTROLLED AND VERIFIABLE INFORMATION DESTRUCTION

FIELD OF THE INVENTION

This invention relates to digital data processing and storage, and more particularly to digital information archival systems for storing time-sensitive data.

BACKGROUND TO THE INVENTION

With increased emphasis on the need for privacy and data protection, laws will be coming into effect as to fixing the periods of time that companies, institutions and governments may retain personal information. Since it is very easy for a false declaration to be made that such time-sensitive information files have been deleted, there is a need for a system that can reliably demonstrate or prove that the information in a stored information file is no longer available and has been destroyed.

STATEMENTS OF THE INVENTION

Aspects of the present invention are set out in the accompanying claims. According to one aspect, the present invention provides a method of storing digitally encoded information as a sequence of numbers or symbols in which changes are made to some of the numbers or symbols such that after a given total of changes the said information cannot be retrieved from said sequence of numbers or symbols.

According to another aspect, the present invention provides a method of verifying that original time-sensitive information encoded in a data file is rendered illegible, by identifying changes made to the encoded information during the lifetime of the information, and determining from the identified changes to the data file that the original information cannot be recovered after the lifetime of the information in the data file is exceeded.

The changes may be cumulative. Changes may be made after a given period of time has expired. The changes made may be errors or erasures to some of the numbers or symbols. In the case of errors, the affected numbers or symbols are changed in value. In the case of erasures, the affected numbers or symbols are changed to a fixed value which signifies that the number or symbol in question has been erased and alternative means will be required to determine the previous value. Such alternative means include the use of parity symbols from an error correcting code, appended to the encoded information.

A public record may be produced listing the positions of the errors or erasures in the data file. In other aspects, the information contained in the data file may be declared irretrievable when the number of errors or erasures exceeds a given value.

The encoded information may be modified, for example by scrambling or encryption, prior to changes being made to the modified information. The encoded information may be scrambled using a key such that the key is needed in order to descramble the modified information after correcting any errors or erasures using parity check symbols. These parity check symbols may be derived from the modified information using an error correcting code, and appended to the modified information, wherein the parity check symbols are used to retrieve the original modified information.

Following changes made to a data file, a hash may be calculated and with a timestamp and other supplemental information may be published in a block chain.

A data file which has been subject to changes may be authenticated by calculating a hash and comparing the value with that published on the block chain.

The encoded information may consist of an encryption or decryption key.

At least a portion of the original encoded information may be excluded or omitted from change.

According to yet another aspect, the present invention provides a method of destroying a portion of encoded information at periodic intervals over a defined lifetime of the information, whereby the destroyed portions are only recoverable within the defined lifetime.

According to a further aspect, the present invention provides a data storage system comprising a data store and a storage controller coupled to the data store, wherein the storage controller comprises means for retrieving encoded data stored in the data store at periodic intervals over a defined lifetime of the data, and means for destroying a portion of the retrieved encoded data, whereby the destroyed portions are only recoverable within the defined lifetime.

The system may further comprise a retriever module operable to receive encoded data from the storage controller, and to process the received encoded data to recover the destroyed portions. The means for destroying and recovering data may implement a data processing algorithm having data correction capability, such as insertion and correction of spelling errors, adding and removal of image data noise to image data, lossy compression and de-compression of image data, or adding and correcting errors or erasures using parity symbols or repetition codes.

In other aspects, there is provided a system configured to perform the methods as described above. The system may comprise software to simulate a device configured to perform the methods outlined above so as to produce the same numerical outputs as the corresponding hardware. The system may comprise hardware or software or a combination of hardware and software that implements any of the methods outlined above.

BRIEF DESCRIPTION OF THE DRAWINGS

There now follows, by way of example only, a detailed description of embodiments of the present invention, with references to the figures identified below. Corresponding reference numerals are used in the figures where appropriate for corresponding elements across the various embodiments.

DETAILED DESCRIPTION OF EMBODIMENTS OF THE INVENTION

Figure 1:
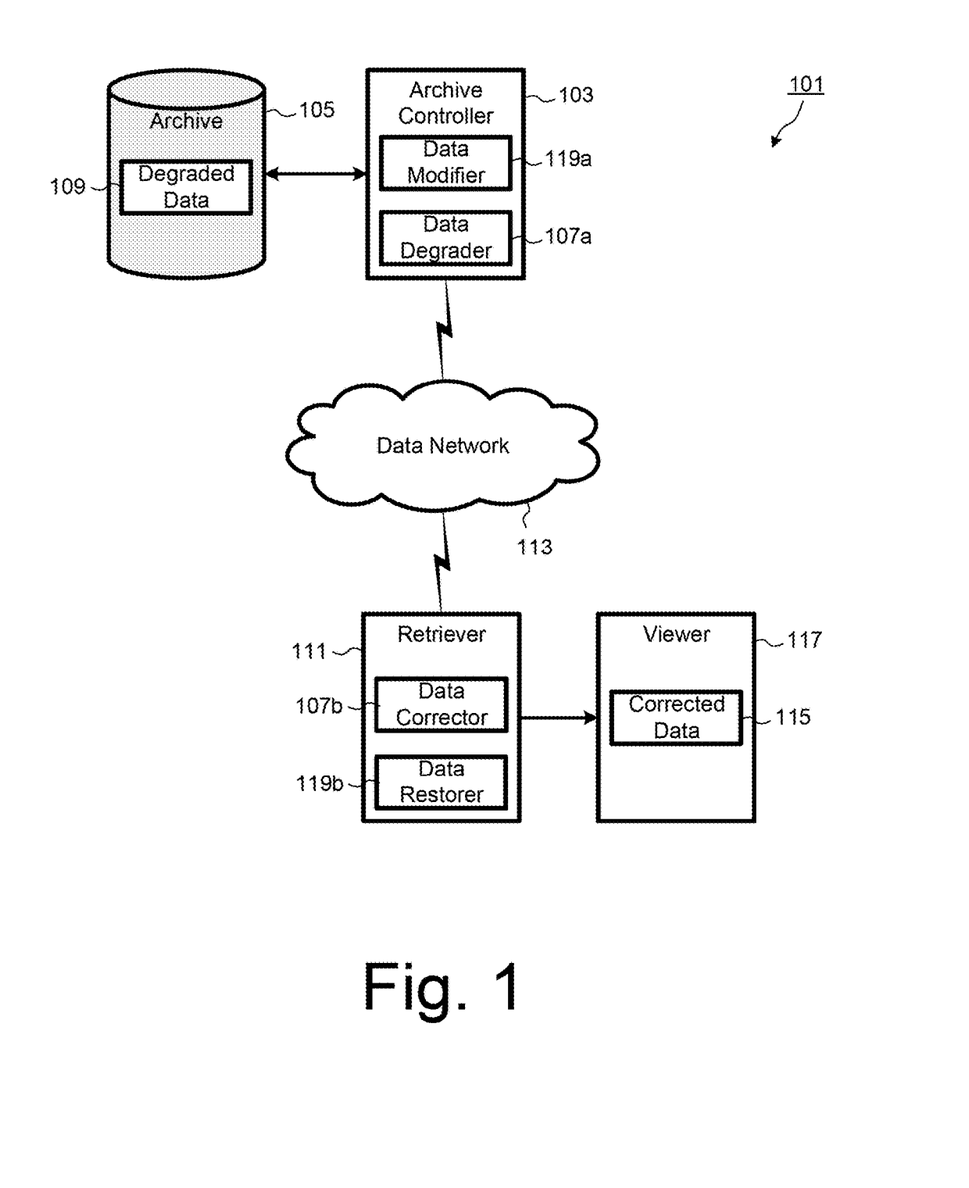
FIG. 1 is a block diagram of a data processing system according to an embodiment, in which digital data stored in an archive is periodically retrieved for controlled degradation over a predefined time period.

An exemplary embodiment of the invention will now be described for a process of controlled destruction of information in a time-sensitive digital data file over the information's lifetime. As shown in FIG. 1, a data processing system 101 according to an embodiment includes an archive controller 103 communicatively coupled to a data archive 105 for storing digital data, such as documents or data files having information encoded in digital form. The data archive 105 may comprise one or more data stores provided local to or remote from the archive controller 103. The archive controller 103 is configured to periodically retrieve the documents from the archive 105 at defined time intervals, and to process the document using a data degrader 107a that applies data processing to destroy or degrade the information in each document, for example by adding a determined number of errors to each document. The degraded document data 109 is stored back in the archive 105. Preferably, the degraded version 109 of the document replaces the original document data, such that all previous versions of each degraded document are deleted. The degradation time interval may be defined for the system as a whole, or on a per document basis. Purely by way of example, the period between file degradation may be one year from the date that the original document is stored in the data archive 105 or the last time the document was degraded. Any other degradation time interval may be used, for example depending on the particular implementation context.

The system 101 also includes a data retriever module 111 configured to retrieve data from the data archive 105 via the archive controller 103, for example upon determination by the archive controller 103 that the defined degradation time interval for a stored document is met or exceeded. The retriever module 111 may form part of a document retrieval system remote from the data archive 105, and in communication with the archive controller 103 over a data network 113. For example, degraded document data 109 containing errors is retrieved from the archive 105, and the errors are corrected by a complementary data corrector 107b of the retriever module 111. The corrected document data 115, free from errors, is output by a viewer module 117, for example on a display (not shown). If the error correction fails due to excessive errors in the degraded data 109, the viewer 117 may output a message indicating that the document has expired. As will be described below, in some embodiments, the retriever 111 may calculate the precise number of errors in the document and display a count of the determined number of errors, together with information such as the maximum number of errors that can be corrected, the age of the document and any supplemental information. It is appreciated that the corrected data 115 may instead or additionally be output in a different form, such as an audible or haptic form, or may be used as input data to a subsequent process.

The data degrader 107a and the complementary data corrector 107b implement corresponding functions of a data processing algorithm having data correction capability, such as insertion and correction of spelling errors, adding and removal of noise to image data, lossy compression and de-compression of image data, adding and correcting errors or erasures using parity symbols or repetition codes, etc., such that the original information is periodically deteriorated or degenerated over time, but remains recoverable up to the predefined lifetime of the document. Specific example implementations are described in more detail in the embodiments below. It will also be appreciated that the retriever module 111 may be further configured to authenticate that all of the original information has been recovered by means of a calculated hash function or verified digital signature. In this way, the system 101 can reliably demonstrate or prove that the information in a stored time-sensitive file 109 has been recovered or is no longer available and has been destroyed or otherwise rendered illegible.

As will also be described in more detail below, the archive controller 103 may additionally include a data modifier module 119a to perform pre-processing of original document data before degradation by the data degrader 107a, and the retriever module 111 may include a corresponding data restorer 119b to perform post-processing of the error-corrected data output by the data corrector 107b. The data modifier 119a and the complementary data restorer 119b may implement corresponding functions of a data processing algorithm that obfuscates, scrambles, encodes or encrypts, etc. the original data before errors are added to the data.

Figure 2A:
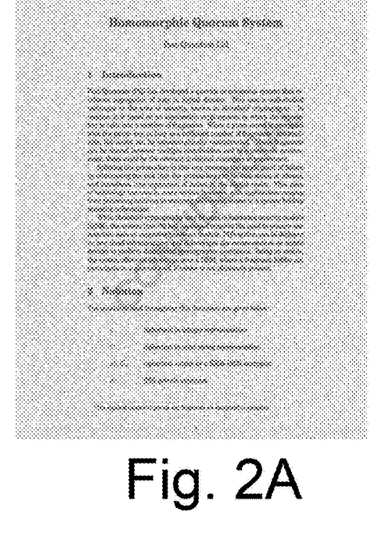
FIG. 2A illustrates an example of a degraded digital document.

FIG. 2, which comprises FIGS. 2A to 2D, illustrate an example sequence of a degraded digital document over time. In this example, the information file is a scanned document as a digital image and the information is to be retained in the archive 105 for a maximum of seven years. The data file is retained for a longer period as proof of information destruction. The data degrader 107a may be configured to perform processing of the image data to compress the data, using any known lossy image compression algorithm. It will be appreciated that the respective amount of lossy compression at each defined degradation interval may be determined based the lifetime of the information stored in the archive 105. In this exemplary embodiment, the errors in the image data are corrected by the data corrector 107 which uses the redundancy of the conveyed information in the image to correct the errors. As an example, suppose that after optical character recognition on the decompressed image data, part of the document data reads:

John Bull whs born in Huddersfield General Hospital ov the 10$^{th}$ August 1989 to parwnts Helen Alice Bull and David Edward Bull . . . .

In this example, the data corrector 107b performs automatic optical character recognition (OCR) processing of the image data, as is generally known in the art, to obtain recognised text data and then processes the recognised text data to correct spelling errors introduced into the document data by the data degrader 107a. For example, the data corrector 107b may process the recognised text data to determine that the language is English and by using a corresponding word dictionary, produce a list of the closest words for each word that is read from the document. Then, using a tree search of the context of English phrases from a context database of common phrases, the data corrector 107b may output the most likely sentence for presentation by the viewer 117.

Following from the above worked example, the data corrector 107b outputs to the viewer 117 the corrected sentence:

John Bull was born in Huddersfield General Hospital on the 10$^{th}$ August 1989 to parents Helen Alice Bull and David Edward Bull . . . .

It can be seen that the introduced errors have been corrected.

Figure 2B:
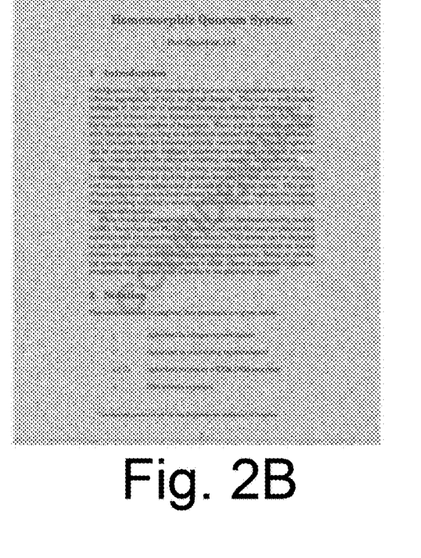
FIG. 2B illustrates an example of the digital document further degraded after two years.

FIG. 2B shows an example degraded document after two years, following the addition of further random errors such as pseudo-random noise to the image data, or the effective subtraction of image information due to image data compression. It will be appreciated that the data corrector 107b may be configured to perform image data processing to remove the noise or decompress the degraded image data, before performing OCR on the recovered image data and correcting any errors in the recognised text, as discussed above.

Figure 2C:
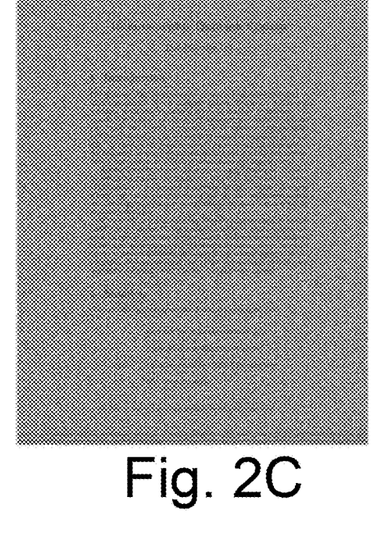
FIG. 2C illustrates an example of the digital document further degraded after six years.

FIG. 2C shows the same document after 6 years. The correct text is just about correctable by the data corrector 107b after a significant amount of computer signal processing and analysis of the degraded image data.

Figure 2D:
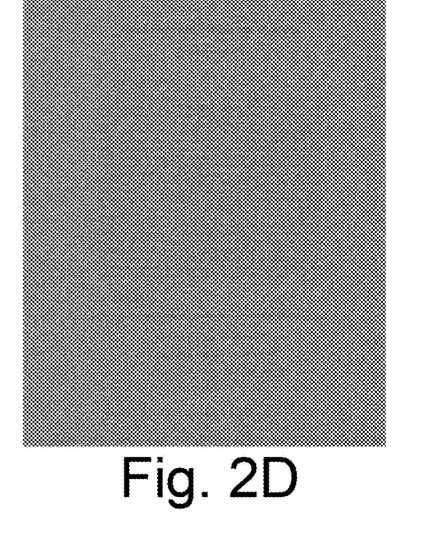
FIG. 2D illustrates an example of the digital document further degraded after seven years.

After 7 years there are too many errors in the data file for the information content of the document to be recovered, as shown in FIG. 2D. There is just too much noise present in the degraded image data for the data corrector 107b to recognise any symbols or characters and recover the original information. Optionally, to provide proof that this is the same document as the original document, reference data, such as the document number and date, present on the original document may be shielded from the addition of errors by the data degrader 107a so that this information can still be displayed by the viewer 117. For compliance, it may be necessary for penalties to be imposed by the authorities if any earlier copies of the file or related information, such as a record of the error positions, are found in the data archive.

Figure 3:
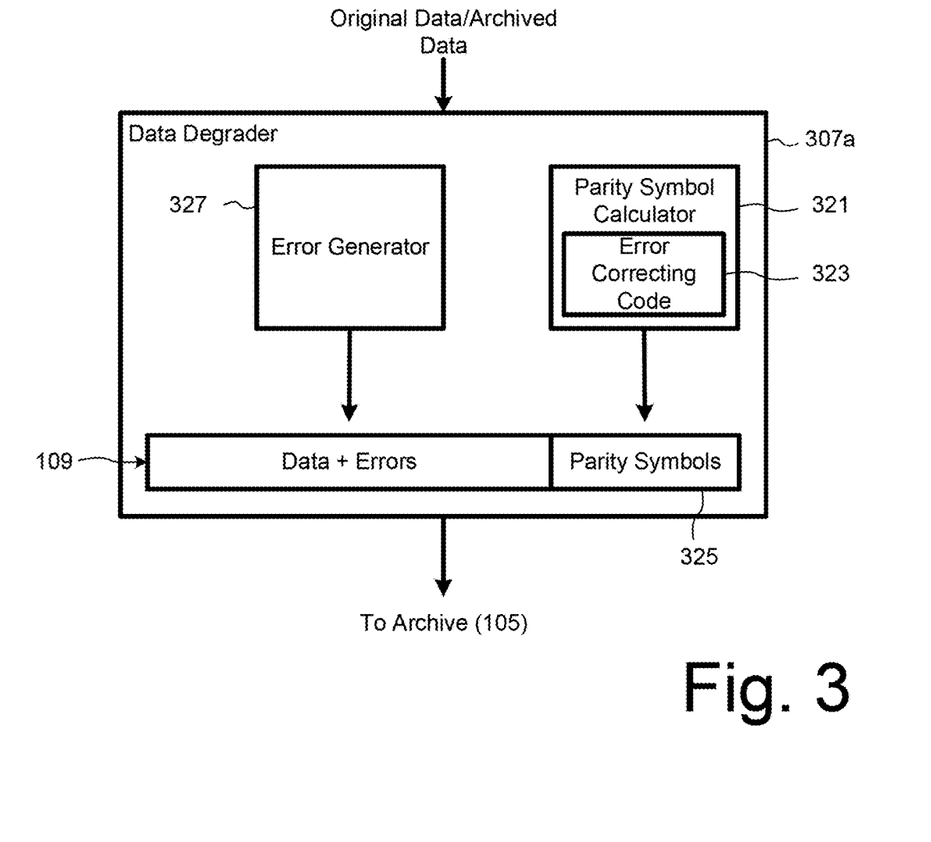
FIG. 3 is a block flow diagram of an exemplary data degrader according to another embodiment.

FIG. 3 is a block flow diagram of an exemplary data degrader 307a according to another embodiment. As shown in FIG. 3, a parity symbol calculator 321 of the data degrader 307a is configured to add a precise amount of redundancy to the original data by producing and appending parity symbols 323 to the archived document from an error correcting code 325. In this embodiment, the correction of introduced errors is carried out by the data corrector 107b to correct the errors. It will be appreciated that parity symbols are calculated only on the original data and not on archived data input to the data degrader.

Errors are added by an error generator 327 to the document data, and subsequently to the archived data, and optionally, to the parity symbols, resulting in the degraded data 109 that is stored back in the archive 105. There are several generally well-known error correcting codes that may be used, for example as discussed in the Springer open access textbook "Error-Correction Coding and Decoding" by Tomlinson, Tjhai, Ambroze, Ahmed and Jibril. Binary codes could be used but the most convenient code is a byte based code using symbols from a Galois field, $GF(2^8)$ generated by a binary primitive polynomial of degree 8 such as $1+x+x^2+x^7+x^8$.

The following worked example is provided to show the detailed steps of the data degrader 307a according to this embodiment. The document is encoded so that it is in digital form, represented by digital symbols such as bytes. Each byte, consisting of 8 bits, has a numerical value between 0 and 255.

Consider that the document contains the same sample sentence:

John Bull was born in Huddersfield General Hospital on the 10$^{th}$ August 1989 to parents Helen Alice Bull and David Edward Bull.

When represented using the American Standard Code for Information Interchange, ASCII, the first 22 characters of the sentence becomes the following sequence of numbers:

74 111 104 110 32 66 117 108 108 32 119 97 115 32 98 111 114 110 32 105 110 32

The letter "J" has value 74, "o" has value 111, etc

Bytes are encoded as $GF(2^8)$ symbols which are represented by all of the different binary polynomials of degree 7 or less corresponding to all byte values 0 to 255. For example 19 is represented by $1+x+x^4$ and 33 is represented by $1+x^5$. Different arithmetic rules apply than the usual rules. For example 33 multiplied by 9 is $(1+x+x^4)(1+x^5)$ modulo $1+x+x^2+x^7+x^8=1+x+x^4+x^5+x^6+x^{10}=1+x^5+x^6+x^7$ which is the byte value 225.

The parity symbols are calculated from parity check equations using arithmetic from $GF(2^8)$. The error correcting code that is used is a generalised Reed-Solomon code with m+1 parity check equations defined by the following parity check matrix.

$$\begin{matrix} 1 & 1 & 1 & 1 & 1 & 1 & \ldots & \ldots & 1 & 0 & 0 & 0 & 0 & .. & 0 \\ 1 & \alpha_1 & \alpha_2 & \alpha_3 & \alpha_4 & \alpha_5 & \ldots & \ldots & 0 & 1 & 0 & 0 & 0 & .. & 0 \\ 1 & \alpha_1^2 & \alpha_2^2 & \alpha_3^2 & \alpha_4^2 & \alpha_5^2 & \ldots & \ldots & 0 & 0 & 1 & 0 & 0 & .. & 0 \\ & & & & & & \ldots & & & & & & & & \\ 1 & \alpha_1^m & \alpha_2^m & \alpha_3^m & \alpha_4^m & \alpha_5^m & \ldots & \ldots & \ldots & 0 & 0 & 0 & 0 & .. & 1 \end{matrix}$$

The symbols $\alpha_1, \alpha_2, \alpha_3, \alpha_4, \alpha_5$, etc can be any elements of $GF(2^8)$ provided they are all distinct, namely different from each other.

With m+1 parity check equations there are m+1 appended parity symbols and up to (m+1)/2 added errors can be corrected. For example with 8 parity symbols, up to 4 errors can be corrected in any positions within the document or the parity symbols. It will be appreciated these values are provided by way of a greatly simplified example to illustrate the degradation and correction processes according to the present embodiments. In practice, the parameters used to configure the data degrader 107a and data corrector 107b, such as the number of parity symbols and associated error correction ability, would be determined based on the defined degradation interval and/or lifetime of the or each document stored in the archive 105. For example, there could be 600 parity symbols capable of correcting a total of 300 errors with 50 errors added to the document every year. After six years there would be 300 errors in the document with all errors correctable. After 7 years the document will contain 350 errors and the information in the document will be irretrievable, effectively destroyed.

Considering the example, sample sentence is encoded using 8 parity check equations from the general parity check matrix above the following result is obtained. The parity values are highlighted in bold.

74 111 104 110 32 66 117 108 108 32 119 97 115 32 98 111 114 110 32 105 110 32 72 117 100 100 101 114 115 102 105 101 108 100 32 71 101 110 101 114 97 108 32 72 111 115 112 105 116 97 108 32 111 110 32 116 104 101 32 49 48 116 104 32 65 117 103 117 115 116 32 49 57 56 57 32 116 111 32 112 97 114 101 110 116 115 32 72 101 108 101 110 32 65 108 105 99 101 32 66 117 108 108 32 97 110 100 32 68 97 118 105 100 32 69 100 119 97 114 100 100 32 66 117 108 108 108 108 32 66 117 108 108 46 32 53 142 138 124 72 45 173 146

These eight parity symbols can correct four errors. Following from the above worked example, exemplary errors are introduced in positions 2, 6, 11, and 19 of the data portion. The resulting degraded data 109 is the number sequence:

74 23 104 110 32 93 117 108 108 32 104 97 115 32 98 111 114 110 63 105 110 32 72 117 100 100 101 114 115 102 105 101 108 100 32 71 101 110 101 114 97 108 32 72 111 115 112 105 116 97 108 32 111 110 32 116 104 101 32 49 48 116 104 32 65 117 103 117 115 116 32 49 57 56 57 32 116 111 32 112 97 114 101 110 116 115 32 72 101 108 101 110 32 65 108 105 99 101 32 66 117 108 108 32 97 110 100 32 68 97 118 105 100 32 69 100 119 97 114 100 100 32 66 117 108 108 46 32

It will be observed that the values have changed in symbol positions 2, 6, 11, and 19. The degraded version of the sample sentence becomes:

Jhn ]ull has born?in Huddersfield General Hospital on the 10Aug. 1989 to parents Helen Alice Bull and David Edward Bull.

It is apparent that the added errors in the document have introduced a loss of information but it is clear that the original data is retrievable by processing the degraded data and parity symbols using the complementary error correction. In practice, a large number of errors typically have to be added to defeat the naturally occurring redundancy contained in the document. Alternatively, the redundancy in the document may be rendered ineffective by the features of further embodiments described below.

Figure 4:
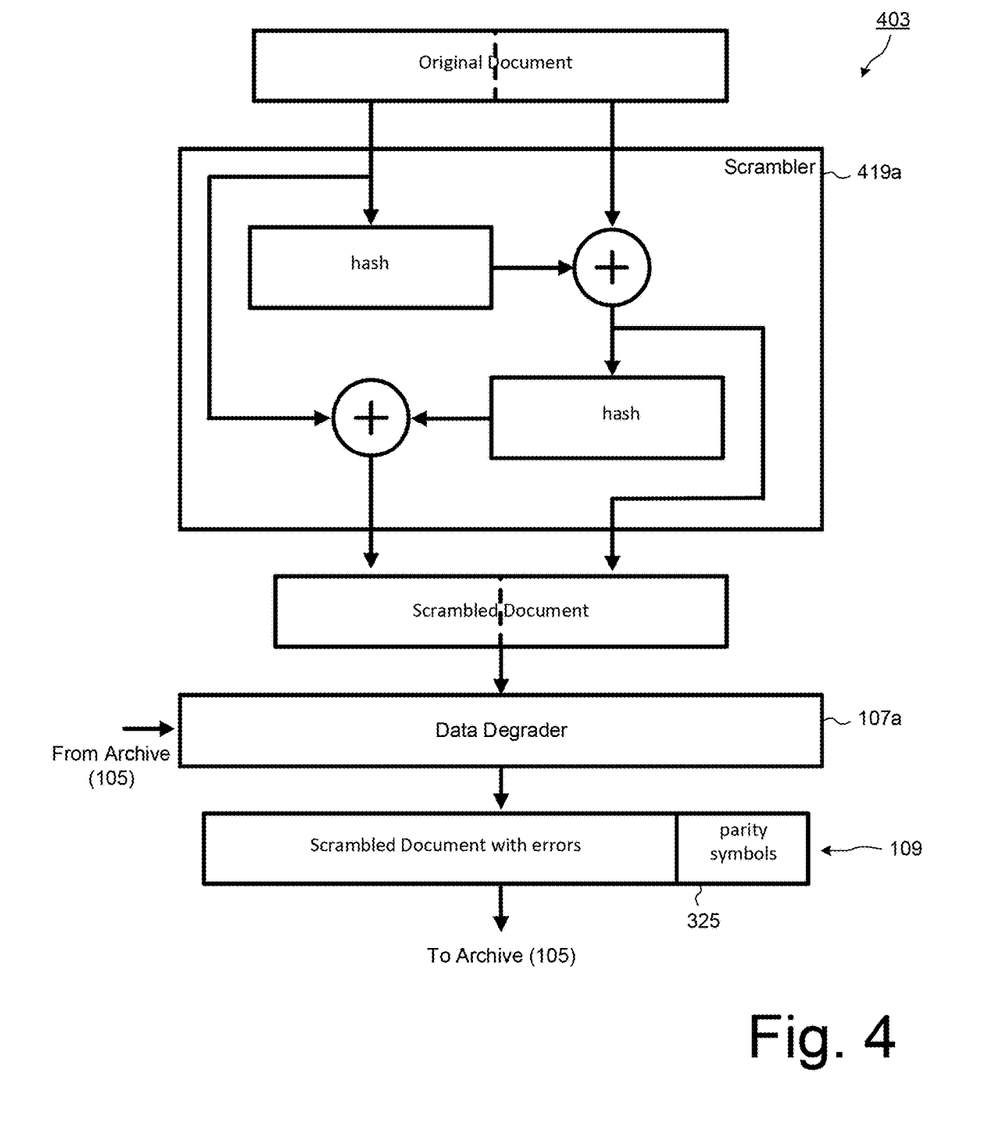
FIG. 4 is a block flow diagram of an exemplary archive controller according to another embodiment.

FIG. 4 is a block flow diagram of an exemplary archive controller 403 according to another embodiment. As shown in FIG. 4, the data modifier of the archive controller 403 in this embodiment is configured as a scrambler module 419a that obfuscates the redundancy in an input document by scrambling the information in the document, before the scrambled document is passed to the data degrader 107a to append parity symbols before adding errors, for example as discussed above. It will be appreciated that parity symbols are calculated only on the original scrambled document and not on archived data subsequently input to the data degrader.

In this exemplary embodiment, the scrambling by the scrambler 419a is achieved by splitting the original document in two. The first half is hashed using an extendable hash function, such as the Keccak algorithm, a sponge function that has been chosen for the SHA-3 hash standard by NIST, the United States National Institute of Standards and Technology. Extendable hash functions have the useful property that any length input and any length output can be used and so can easily match the document length. The hash output is added to the second half of the document, encoded in bytes, and treated as $GF(2^8)$ symbols. Simply, each byte of the hash output is exclusively or'ed with each byte of the second half of the document.

As shown in FIG. 4, the result is hashed and the output is exclusively or'ed with each byte of the first half of the document. Parity symbols 325 may be calculated by the data degrader 107a based on the scrambled document and appended to the scrambled document, for example as described in the embodiment above, before the resulting degraded document 109 is stored back in the document archive 105. It will be appreciated that the scrambling is particularly effective when the Keccak sponge function is used as can be seen from the scrambled version of the sample sentence following from the above worked example. As before, the parity bytes are highlighted in bold and it can be seen that the scrambling system is very effective as, in this particular example, almost every byte value is different from the original:

241 102 115 81 53 30 47 220 61 41 218 122 240 129 91 156 181 129 137 7 211 138 145 112 36 19 181 206 52 168 192 250 99 139 101 143 172 165 234 112 139 88 160 125 128 180 125 164 197 229 93 253 223 105 85 10 41 32 91 222 10 247 103 86 167 58 128 78 129 20 100 119 247 116 243 30 129 203 73 26 216 217 210 146 125 148 220 16 96 169 189 179 13 120 20 97 39 242 205 238 87 209 69 90 145 66 145 40 203 193 201 169 155 50 233 254 92 89 60 140 5 86 133 89 124 202 238 110 55 200 69 82 50 213 127

The data degrader 107a of FIG. 4 adds errors to the scrambled document and subsequently to the archived data, containing parity symbols, input from the archive 105, resulting in degraded data 109 that is stored back in the archive 105.

Figure 5:
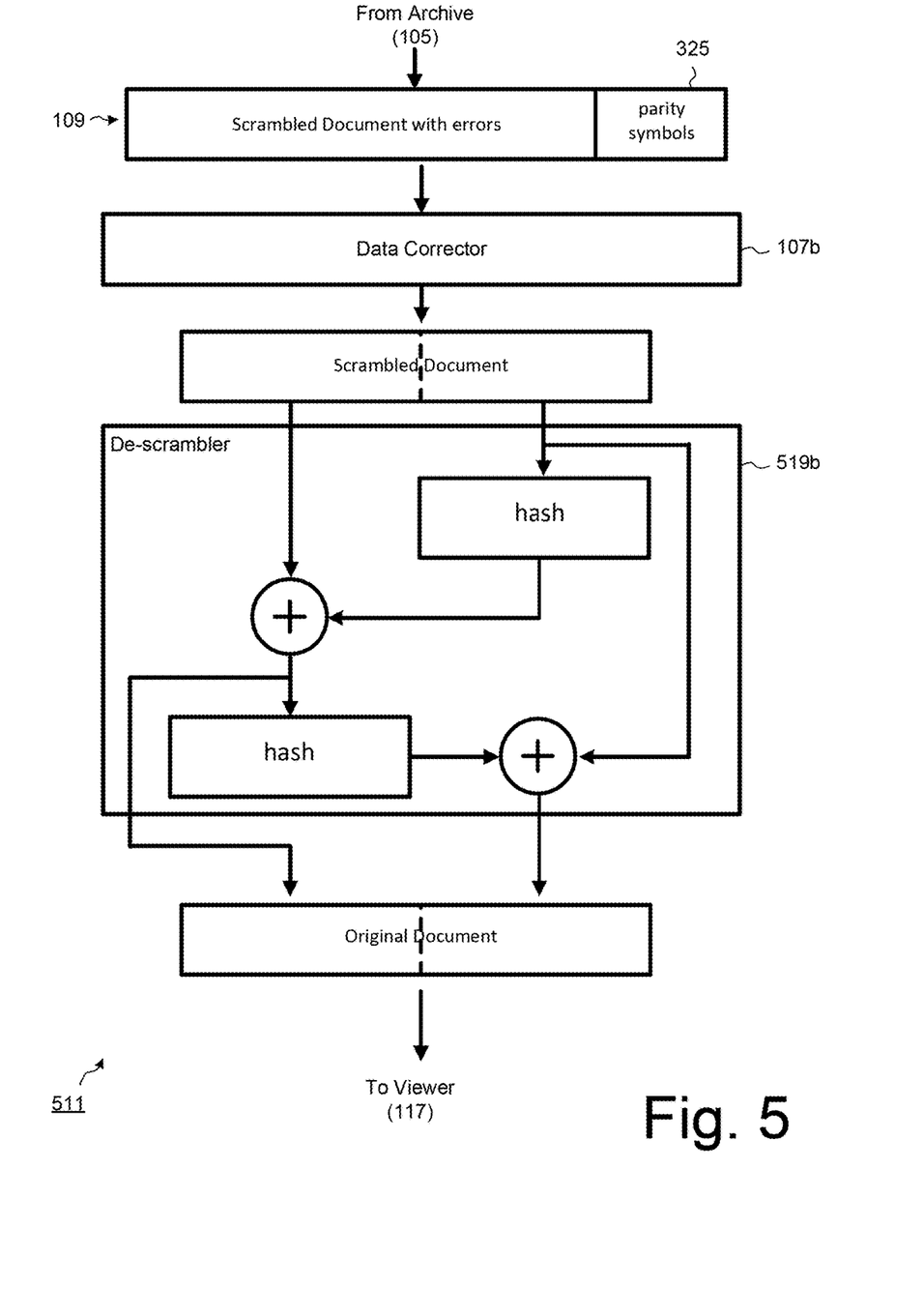
FIG. 5 is a block flow diagram of the complementary document retriever module to the archive controller shown in FIG. 4.

FIG. 5 is a block flow diagram of the complementary document retriever module 511 according to the present embodiment. As shown in FIG. 5, the scrambled document with errors 109 is retrieved from the archive 105 and the parity symbols 325 are used by the data corrector 107b to correct the errors in the scrambled document data portion, for example by using an error correction algorithm for the generalised Reed-Solomon code, as discussed in the cited textbook above. After the errors have been corrected by the data corrector 107b, the output scrambled document is descrambled by the data restorer, which is configured as a descrambler 519b in this embodiment. The data processing by the descrambler 519b is basically a reversal of the operations carried out in scrambling by the scrambler 419a described above with reference to FIG. 4. The second half of the scrambled document is hashed and the result is added to the first half of the scrambled document. Provided all errors in the scrambled document have been corrected the result is the first half of the document unscrambled. This is hashed and added to the second half of the scrambled document, producing the second half of the document, unscrambled. Again, this is provided that there were no residual errors in the scrambled document following error correction.

Periodically, more and more errors are added to the scrambled document by the data degrader 107a of the archive controller 103. When the defined lifetime of the document has been exceeded, there will be more errors in the scrambled document than can be corrected by using the parity symbols 325. The effect of errors in the scrambled document is quite dramatic. With just one residual error in the example scrambled document, the output of the descrambler 519b and presented by the viewer 117 is the byte sequence:

123 59 15 101 165 161 31 13 109 211 224 109 46 182 175 152 220 15 213 188 198 18 49 210 66 56 197 149 92 86 240 52 165 114 254 81 174 102 112 153 174 197 108 78 93 182 100 211 164 101 243 6 115 209 99 192 193 82 132 217 204 131 73 187 210 39 110 192 242 10 59 78 77 22 56 4 156 2 199 237 55 99 111 231 228 171 16 37 21 69 253 99 241 106 33 208 188 28 140 178 25 188 98 14 157 31 193 144 26 103 198 204 31 250 2 105 194 86 222 151

Figure 6:
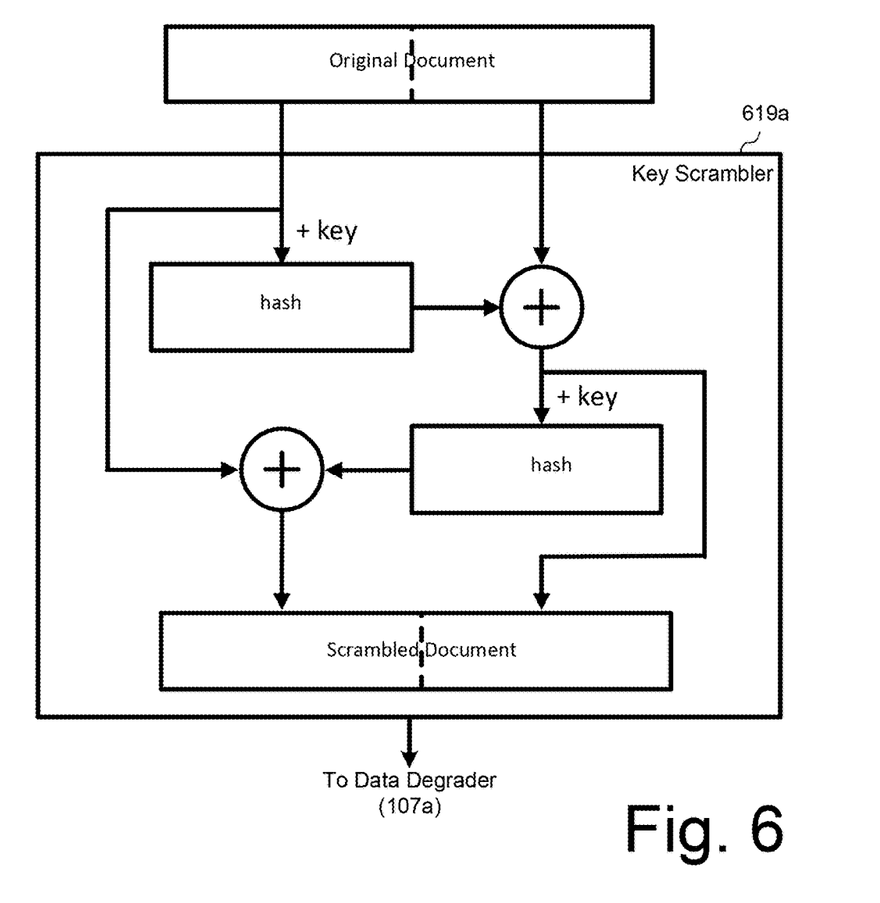
FIG. 6 is a block flow diagram of another exemplary data modifier configured as a key scrambler according to another embodiment.

25 61 81 80 225 97 127 Almost every byte value is different from the original. As a character string the sample sentence is now displayed as random gibberish:
mËOm.Â»ÿ▪┘ãlÊB8+ò\V-4Ñr■Q«fpÖ«+lN]
ÂdËñe¾sÉ c⊥⊥ Rä ┘ ╟âI ╖Ê'nL;NM8    £ÃÝ7co
Þõ½%E²c±j!ð┘¿┘ ■bØ⊥Égã╟iΤ Vİù=QPβ a FIG. 6 is a block flow diagram of another exemplary data modifier configured as a key scrambler 619a according to another embodiment. A keyed scrambling system provides additional privacy to information contained in the scrambled document, similar to encryption. A key is combined with the first half of the message and the scrambled second half of the message as shown in FIG. 6. For example, the key may be concatenated with each stream that is hashed.

As those skilled in the art will appreciate, there are other ways of overcoming the redundancy in the document other than by obfuscation by scrambling. Data compression using signal processing such as the application of the Lempel-Ziv-Welch algorithm, or similar algorithms could be applied to the document. Alternatively or additionally, the original document could be encrypted, for example using a block or stream cipher, before errors and parity symbols are added.

Figure 7:
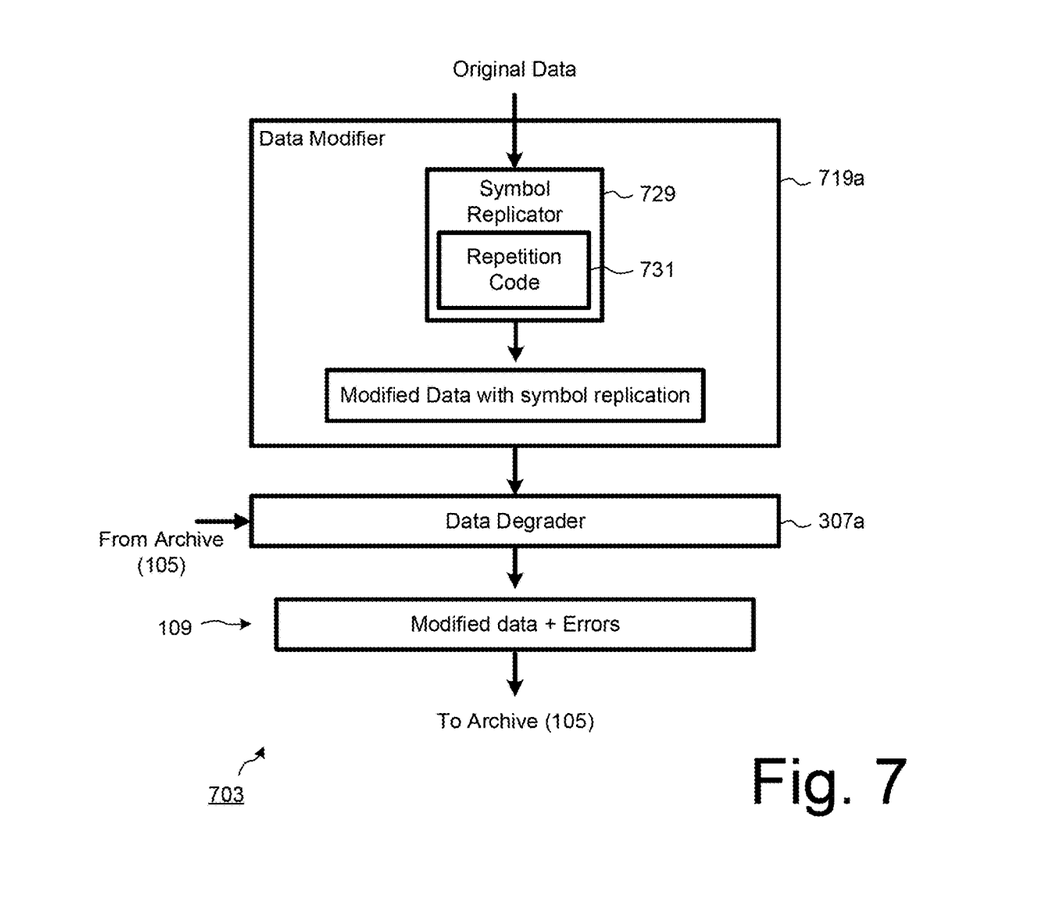
FIG. 7 is a block flow diagram of an archive controller according to another embodiment.

FIG. 7 is a block flow diagram of an archive controller 703 according to another embodiment, in which a symbol replicator 729 of the data modifier 719a uses a repetition code 731 to repeat each byte value a defined number of times, instead of appending parity symbols calculated according to a parity check matrix. One example of a repetition code is one in which each byte value is repeated twice so that for the example above, the first few bytes of the scrambled sequence becomes:
241 241 241 102 102 102 115 115 115 81 81 81 53 53 53 . . . .
Any other form of repetition code may be defined.
With one randomly chosen error added by the data degrader 307a to each group of repeating bytes, the errored sequence output by the error generator 327 is:
117 241 241 102 102 67 115 196 115 81 38 81 53 53 146
These errors are corrected by taking a majority vote of the values in each group. In the first group there are two 241's, in the second group there are two 102's, and so on. The errors may be chosen so that these are all different in the group, the correct value appears at least twice in the group. For example a group with four repeats containing errors could be
241 114 185 241 52. The correct value is 241 because it appears twice.

The advantage of the repetition code 731 is that the position of any errors can be determined from the degraded data 109, and an associated record of the error positions may be stored to authenticate that the document has been subjected to errors over a period of time. When there are so many errors that each group has no byte value in common, then the information has been irretrievably destroyed and the document's lifetime has been exceeded.

Figure 8:
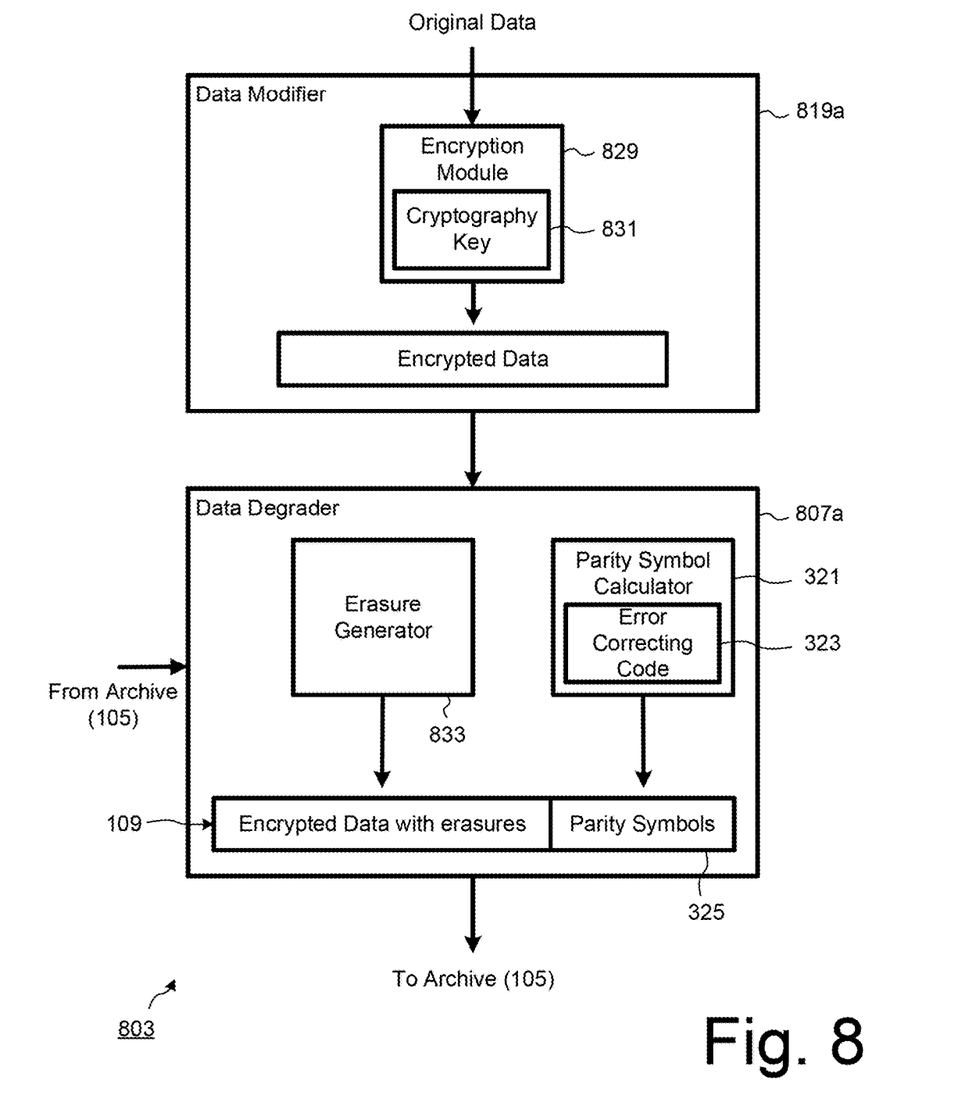
FIG. 8 is a block flow diagram of an exemplary archive controller according to another embodiment.

FIG. 8 is a block flow diagram of an exemplary archive controller 803 according to another embodiment, in which an erasure generator 833 of the data degrader 807a uses erasures to degrade digital data. As shown in FIG. 8, the data modifier 819a may be configured to encrypt input original data by means of an encryption module 829 using a cryptography key 831 to produce encrypted data. The data degrader before adding any erasures uses the parity symbol calculator 321 together with the error correcting code 323 to produce the parity symbols 325 which are appended to encrypted data. After this has been carried out, the erasure generator 833 generates erasures which are added to the encrypted document prior to being saved along with the parity symbols in the archive 105. The data degrader 807a of FIG. 8 subsequently adds further erasures to the archived data, containing parity symbols, input from the archive 105, resulting in degraded data 109 that is stored back in the archive 105.

With erasures, a byte value is marked as being of unknown value. Erasures have a further advantage in that erasures in a degraded document 109 are clearly detectable (visible) and thus the number of erasures can be counted. If the number of erasures exceeds the erasure correction capability provided by the parity symbols and the code, the system is able to precisely determine that the lifetime of the information contained in the document has been exceeded. The viewer can display this event, the number of erasures in the document and the maximum number of correctible erasures. With m+1 parity symbols up to m+1 erasures can be corrected but no more.

A further worked example will now be provided to illustrate the further advantages provided by the present embodiment. In this worked example, the above sample sentence is encrypted with a 256 bit encryption key 831 consisting of the 32 byte values:
225 99 178 91 240 68 24 208 11 146 151 228 27 12 117 84
44 34 109 224 181 90 214 91 197 145 234 9 86 153 94 210
The encrypted sample sentence plus parity symbols becomes
101 132 13 154 18 22 86 209 44 55 109 3 223 59 28 212 56
142 173 183 195 219 92 250 165 164 93 220 120 99 73
71 212 166 100 17 139 59 60 11 165 188 157 90 160 228
55 62 36 84 44 170 12 194 135 102 229 187 76 200 180
99 86 67 201 133 125 28 123 186 57 214 111 155 186 240
191 78 211 73 159 236 35 111 144 31 216 200 89 233 188
48 211 109 69 120 1 48 89 165 222 63 222 62 225 212
161 15 208 118 227 244 0 133 254 43 67 227 143 169 129
115 128 209 114 144 140 204 55 133 135 228 131 253 244

Erasures can conveniently be inserted by replacing the byte values of erased bytes by −1 so that the encrypted sample sentence with 10 erasures, highlighted also in bold, becomes
101 132 13 −1 18 22 86 209 44 −1 109 3 223 59 28 212 56
−1 173 183 195 219 92 250 165 164 93 220 120 99 73 71
212 166 100 17 139 59 −1 11 165 188 157 90 160 228 55
62 36 84 44 170 12 194 135 102 229 −1 76 200 180 99
86 67 201 133 125 28 123 186 57 214 111 55 186 240 191
78 211 73 159 236 35 111 −1 31 216 200 89 233 188 48
−1 109 69 120 1 48 89 165 222 63 222 62 225 212 161
15 208 118 −1 244 0 133 254 43 67 227 143 169 −1 115
128 209 114 144 140 204 55 133 135 −1 131 253 244

Since there are only 8 parity check symbols and 10 symbols have been erased including one parity symbol, the information contained in the document cannot be recovered by straightforwardly correcting the erasures. Of course two of the erased values could be guessed and the 8 erasures remaining corrected by using parity check equations. In this example, the chance of one guess being correct is rather high at 1 in 65536. It is best to make guessing erasure values a futile strategy by having at least 32 more erasures than parity check symbols. Optionally, more erasures may be added to the degraded document 109 at the end of a document's lifetime.

Figure 9:
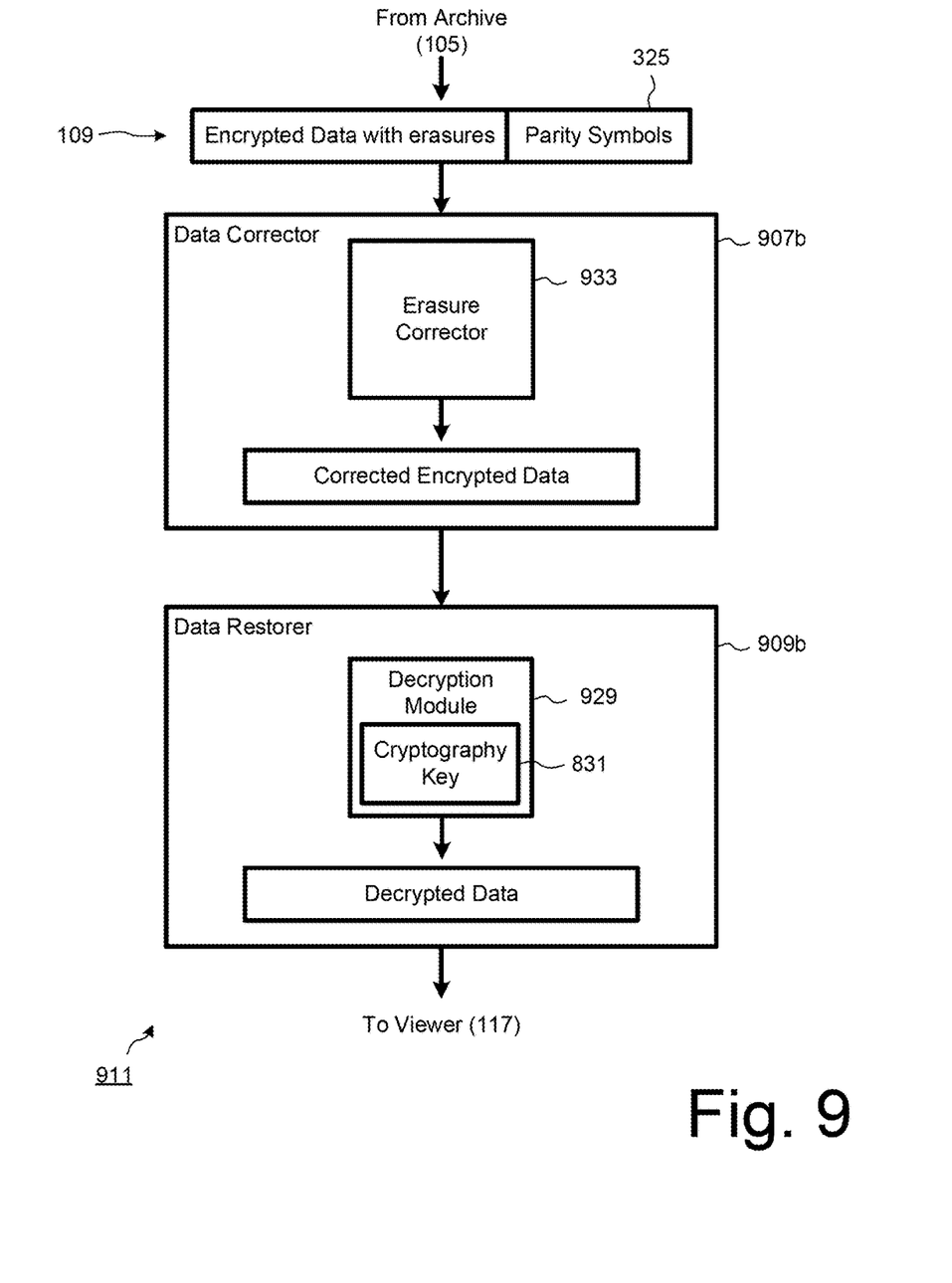
FIG. 9 is a block flow diagram of the complementary document retriever module to the archive controller shown in FIG. 8.

FIG. 9 is a block flow diagram of the complementary document retriever module 911 according to the present embodiment. As shown in FIG. 9, the degraded document 109, which in this embodiment is the encrypted cipher text having a number of erasures dependent on how long it has been stored in the archive, along with the parity symbols, is retrieved from the documents archive 105, via the archive controller 103. The erasures are corrected by an erasure corrector 933 of the data corrector 907b solving the m+1 simultaneous parity check equations, as is generally well-known for example as taught in the textbook cited above. Purely as one example, Gauss-Jordon elimination is a conventional method of solving such simultaneous equations but any other suitable implementation is possible. With the erased symbols determined and corrected by the erasure corrector 933, the corrected encrypted document is passed to the data restorer 909b, which uses a complementary decryption module 929 to decrypt the input data as shown in FIG. 9. The decrypted data is output to the viewer 117, for example to display the restored data to the person requesting the document.

Encrypting the documents provides the added advantage of controlling access to the document since the decryption key 831 needs to be supplied to the decryption module 929 by an authorised holder of the key. Different keys may be used for different documents or classes of documents. Both types of encryption, symmetric key or public key encryption, may be used depending upon the type of application for the invention.

Figure 10:
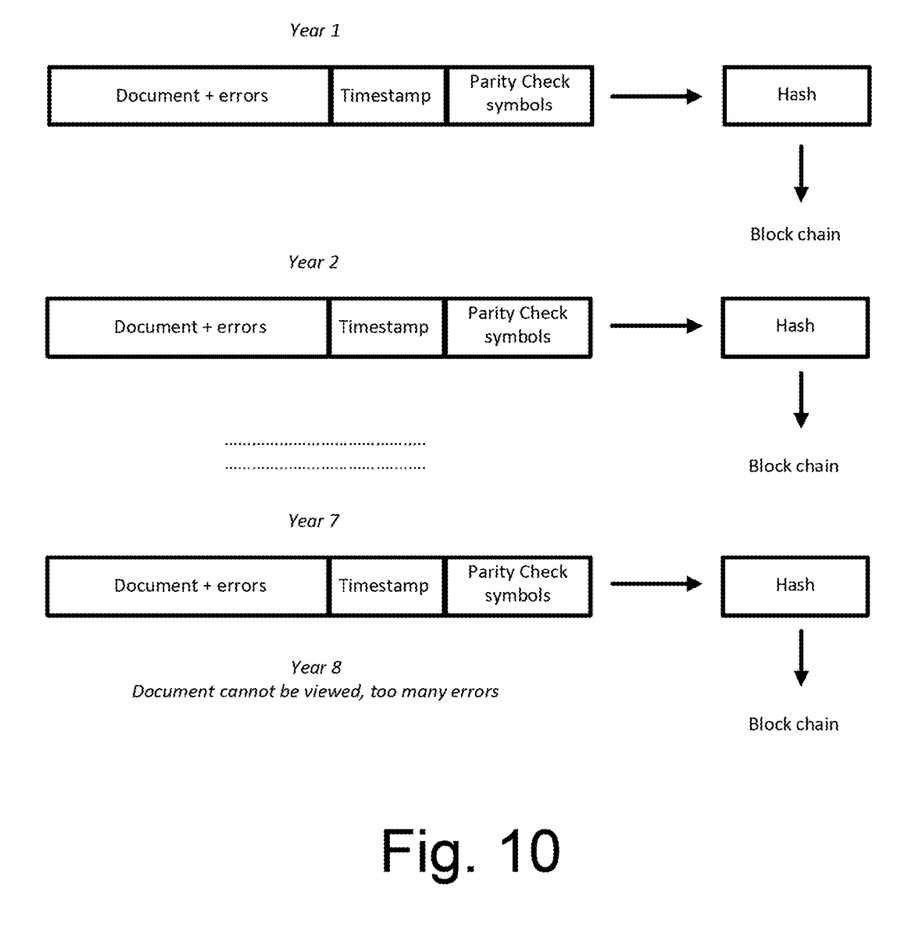
FIG. 10 is a block diagram schematically depicting a sequence of annual events according to a further alternative embodiment, in which a document with an increasing number of errors, appended with a timestamp and parity check symbols is hashed to produce a hash which is stored in a block chain.

FIG. 10 is a block flow diagram schematically illustrating a further alternative embodiment, in which the degraded document 109 is stored as a block chain data structure. As is generally known in the art, a block chain data structure maintains a continuously-growing list of ordered records called blocks that cannot be altered retroactively. Proof that the periodic degradation of documents, that are stored in the archive, has taken place may be provided by the block chain. Referring to the example shown in FIG. 10, additional errors are added every year until year 8 when there are too many errors to retrieve the information in the document. Each time further errors or erasures are added to the document, the hash of the current document plus a timestamp is added to the block chain and published. Since the block chain eliminates the possibility of hash manipulation because hash values cannot be changed after the block chain has been published, authentication of degraded documents stored in the archive is straightforward. These are simply hashed and the hash values compared to the corresponding values on the block chain. For documents in scrambled or encrypted form the same procedure is applied. The hash is calculated of the scrambled or encrypted document corrupted by errors or erasures plus any timestamp and/or supplementary information.

In the case of erasures, a record of the erasure positions of a document, or a hashed record, may be kept on the block chain. As discussed in the embodiments above, depending on the implementation, the data retriever 111 may be configured to check that the recorded erasure positions correspond to actual erased symbols in the document, or its scrambled or encrypted version.

Figure 11:
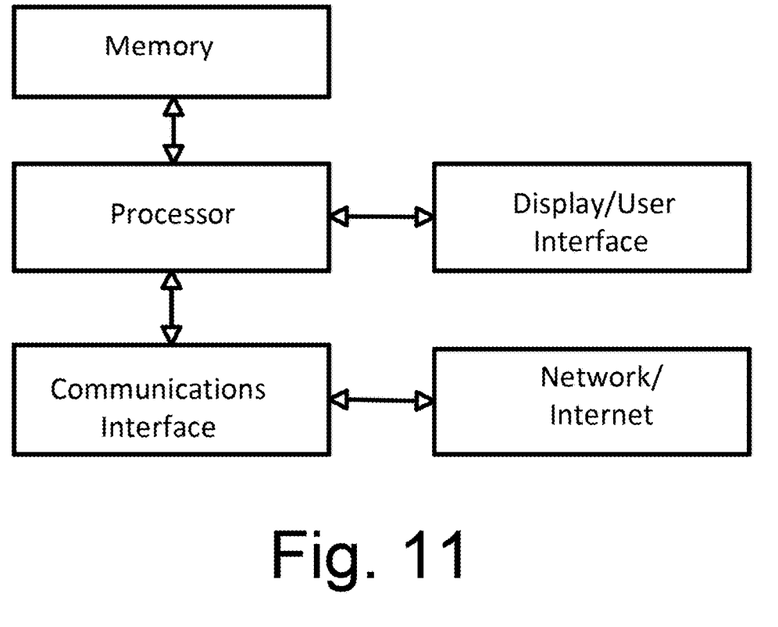
FIG. 11 is a block diagram of a computer system on which one or more of the functions of the embodiments may be implemented.

The computing entities of the various embodiments described herein, such as the archive controller and data retriever, may be implemented in software and/or hardware running on a computing platform represented schematically in FIG. 11 which may be a well-known type of platform, such as a server, a desktop computer, laptop computer, a tablet computer, a smartphone such as an iOS™, Blackberry™ or Android™ based smartphone, a 'feature' phone, a personal digital assistant (PDA), or any processor-powered device with suitable input and display means. Network/Internet communications may comprise a terrestrial cellular network such as a 2G, 3G or 4G network, a private or public wireless network such as a WiFi™ based network and/or a mobile satellite network or a wired/fibre communications system. Embodiments of the present invention may be implemented as programmable code for execution by such computer systems. It will be appreciated that as further alternative embodiments, software may be produced that simulates the actions of circuits such as used in digital encoding, error correction coding, scrambling and descrambling, data compression, encryption and decryption devices, hash function devices and general memory devices used to implement any one of the embodiments described above. After reading this description, it will become apparent to a person skilled in the art how to implement the invention using computer systems and/or computer architectures.

Yet further alternative embodiments may be implemented as control logic in hardware, firmware, or software or any combination thereof. For example, the degradation and correction modules may be provided as one or more distributed computing modules or processing services on a remote server that is in communication with a data archive system via the data network. Additionally, as those skilled in the art will appreciate, the data processing functionality may be provided as one or more application programming interface (API) accessible by an application program executing on one or more computing devices, or as a plug-in module, extension, embedded code, etc., configured to communicate with the application program.

Alternatives and Modifications

It will be understood that embodiments of the present invention are described herein by way of example only, and that various changes and modifications may be made without departing from the scope of the invention. For example, it should be appreciated that the computing modules of the exemplary embodiments may be combined into a single module or divided into additional modules, and the system may include additional components, sub-components, modules, and devices commonly found in a computing system/device, which are not illustrated for clarity of the description. As another example, the information encoded as a sequence of numbers or symbols may be an encryption key which has been used to encrypt a set of data files. When the number of errors or erasures are such that the encryption key cannot be recovered all of the information contained in the encrypted data files will be irretrievable and lost.

As those skilled in the art will appreciate, references in this specification to separate or alternative embodiments are not necessarily mutually exclusive of other embodiments. In particular, it will be appreciated that aspects of the above discussed embodiments can be combined to form further embodiments. For example, the scrambling and/or cryptography aspects from respective alternative embodiments described above may be combined with the data degrader from another embodiment to form a further alternative embodiment. Similarly, various features are described which may be exhibited by some embodiments and not by others. Yet further alternative embodiments may be envisaged, which nevertheless fall within the scope of the following claims.

The invention claimed is:

1. A method comprising one or more processors performing the steps of:
    storing digitally encoded information, wherein the information is encoded as a sequence of numbers or symbols using parameters defining an associated error correction ability of an error correcting algorithm based on a lifetime of the digitally encoded information; and
    periodically adding errors to the sequence of numbers or symbols, such that the digitally encoded information is recoverable from the sequence of numbers or symbols during the lifetime, and after a total number of added errors exceeds the associated error correction ability, the digitally encoded information cannot be retrieved.

2. The method of claim 1, wherein the errors are cumulative and are made after a defined lifetime has expired.

3. The method of claim 1, wherein the errors result in numbers or symbols being erased from the sequence of numbers or symbols.

4. The method of claim 1, wherein a public record is produced which lists positions of the errors together with a timestamp.

5. The method of claim 1, further comprising determining the number of added errors in the digitally encoded information.

6. The method of claim 1, further comprising modifying the digitally encoded information, before errors are added.

7. The method of claim 6, wherein the modifying comprises scrambling the digitally encoded information as a sequence of scrambled numbers or symbols.

8. The method of claim 7, in which the scrambling is a keyed scrambling such that a key is needed to descramble the digitally encoded, scrambled information.

9. The method of claim 6, wherein the modifying comprises encrypting the digitally encoded information as a sequence of encrypted numbers or symbols.

10. The method of claim 1, further comprising:
deriving parity check symbols from the digitally encoded information using an error correcting code; and
appending the parity check symbols to the digitally encoded information, wherein the parity check symbols are used to recover the digitally encoded information after errors are added.

11. The method of claim 6, further comprising:
deriving parity check symbols from the modified digitally encoded information using an error correcting code; and
appending the parity check symbols to the modified information, wherein the parity check symbols are used to recover the modified information after errors are added.

12. The method of claim 1, further comprising after errors have been added, calculating a hash of the sequence of numbers or symbols together with a time stamp and other supplemental information and publishing the hash value in a block chain.

13. The method of claim 12, further comprising authenticating the sequence of numbers or symbols by calculating the hash of the sequence of numbers or symbols and comparing the calculated hash value with that published on the block chain.

14. The method of claim 1, wherein the encoded information is an encryption or decryption key.

15. The method of claim 1, wherein at least a portion of the digitally encoded information is excluded from adding of errors.

16. The method of claim 5, further comprising verifying that the digitally encoded information is rendered irretrievable based on the determined number of errors.

17. A data storage system comprising:
a data store; and
a storage controller coupled to the data store,
wherein the storage controller is operable, using one or more processors, to:
retrieve encoded data stored in the data store at periodic intervals over a defined lifetime of the data, wherein the data is encoded using parameters defining an associated error correction ability of an error correcting algorithm based on a lifetime of the data; and
destroy a portion of the retrieved encoded data,
whereby the destroyed portions are only recoverable within the defined lifetime and after a total of destroyed portions exceeds the associated error correction ability, the data cannot be recovered.

18. The system of claim 17, further comprising a retriever module operable to receive encoded data from the storage controller, and to process the received encoded data to recover the destroyed portions.

19. The system of claim 17, wherein the storage controller implements a data processing algorithm having data correction capability, including one or more of: insertion and correction of spelling errors, adding and removal of image data noise to image data, lossy compression and de-compression of image data, and adding and correcting errors or erasures using parity symbols or repetition codes.

20. A non-transitory computer-readable medium comprising computer-executable instructions, that when executed, perform the operations of:
storing digitally encoded information, wherein the information is encoded as a sequence of numbers or symbols using parameters defining an associated error correction ability of an error correcting algorithm based on a lifetime of the digitally encoded information; and
periodically adding errors to the sequence of numbers or symbols, such that the digitally encoded information is recoverable from the sequence of numbers or symbols during the defined lifetime, and after a total of number of added errors exceeds the associated error correction ability, the digitally encoded information cannot be retrieved.

* * * * *